(12) United States Patent
Fuma et al.

(10) Patent No.: US 8,384,236 B2
(45) Date of Patent: Feb. 26, 2013

(54) VEHICLE MOUNTED CONVERTER

(75) Inventors: Hiroo Fuma, Gifu (JP); Takaji Umeno, Nisshin (JP); Kota Manabe, Toyota (JP)

(73) Assignee: Kabushiki Kaisha Toyota Chuo Kenkyusho, Aichi-Gun (JP)

( * ) Notice: Subject to any disclaimer, the term of this patent is extended or adjusted under 35 U.S.C. 154(b) by 453 days.

(21) Appl. No.: 12/659,526

(22) Filed: Mar. 11, 2010

(65) Prior Publication Data

US 2010/0237694 A1 Sep. 23, 2010

(30) Foreign Application Priority Data

Mar. 18, 2009 (JP) ................................ 2009-066682

(51) Int. Cl.
*B60L 1/00* (2006.01)
(52) U.S. Cl. ........................................ 307/9.1
(58) Field of Classification Search ............... 307/9.1
See application file for complete search history.

(56) References Cited

U.S. PATENT DOCUMENTS

| | | | | |
|---|---|---|---|---|
| 8,004,109 | B2 * | 8/2011 | Komatsu | 307/9.1 |
| 2010/0033011 | A1 | 2/2010 | Okazaki et al. | |
| 2010/0038962 | A1 | 2/2010 | Komatsu | |

FOREIGN PATENT DOCUMENTS

| | | |
|---|---|---|
| JP | A-7-115773 | 5/1995 |
| JP | A-8-308255 | 11/1996 |
| JP | A-2003-304681 | 10/2003 |
| JP | A-2008-167620 | 7/2008 |
| JP | A-2008-253011 | 10/2008 |

OTHER PUBLICATIONS

Apr. 19, 2011 Office Action issued in Japanese Patent Application No. 2009-066682 (with translation).

* cited by examiner

*Primary Examiner* — Hal Kaplan
(74) *Attorney, Agent, or Firm* — Oliff & Berridge, PLC (57) ABSTRACT

An object is to miniaturize device size in a vehicle mounted converter. The vehicle mounted converter includes a plurality of inductors, a switching unit for switching current path, an external power acquisition unit for acquiring alternating current power from a power generation source provided separately from the mounted vehicle, and a switching means for switching a circuit connection state to a connection state of either a boost connection state for connecting one end of the inductors to a path to a battery for vehicle drive power supply and connecting the switching unit to the other end of the inductors, or a charging connection state for connecting one end of one of the plurality of inductors to the path to the battery, disconnecting one end of the remaining inductors from the path to the battery and connecting to the external power acquisition unit, and connecting the other end of the inductors to the switching unit.

3 Claims, 9 Drawing Sheets

VEHICLE MOUNTED CONVERTER

PRIORITY INFORMATION

This application claims priority to Japanese Patent Application No. 2009-066682 filed on Mar. 18, 2009, which is incorporated herein by reference in its entirety.

BACKGROUND OF THE INVENTION

1. Field of the Invention

The present invention relates to a vehicle mounted converter including a plurality of inductors for performing switching of currents flowing to the inductors.

2. Description of Related Art

Hybrid automobiles and electric automobiles traveling by the driving force of a motor are widely used. These motor driven vehicles include a battery for supplying the driving power to the motor and a booster converter for boosting a battery voltage and outputting the boosted voltage to a motor drive circuit.

The booster converter includes inductors and switching circuits for switching currents flowing to the inductors. The inductors generate an induced electromotive force by switching of the currents. The booster converter outputs to the motor drive circuit a boosted voltage where the induced electromotive force has been added to an input voltage. As a result, the booster converter can output a voltage higher than the battery voltage to the motor drive circuit.

In recent years, external charging devices for vehicle mounting have been developed for charging a battery by supplying power to the battery from a commercial power supply receptacle or other external power supply device. However, when mounting an external charging device in addition to a battery and booster converter to a vehicle, there was a problem with the increase in size of the system.

For example, Japanese Patent Laid-Open Publication No. Hei 8-308255 discloses a device for performing external charging using part of a vehicle mounted inverter, which performs direct current to alternating current conversion. An external charging circuit using part of the inverter is configured in this device and the addition of a large inductor is considered necessary.

The present invention solves this problem, namely, by miniaturizing the device size for a vehicle mounted power supply device having an external charging function.

SUMMARY OF THE INVENTION

The present invention is a vehicle mounted converter including a plurality of inductors; a switching unit for switching a current path; an external power acquisition unit for acquiring alternating current power from a power generating source provided separately from a mounted vehicle; and a switching means for switching a connection state of inductors, the switching unit, and the external power acquisition unit to a connection state of either a boost connection state for connecting one end of each inductor to a path to a battery for vehicle drive power supply and connecting the other end of each inductor to the switching unit, or a charging connection state for connecting one end of one of the plurality of inductors to the path to the battery, disconnecting one end of remaining inductors from the path to the battery and connecting to the external power acquisition unit, and connecting the other end of each inductor to the switching unit; wherein the switching unit, when the switching means sets the connection state to the boost connection state, outputs from the vehicle mounted converter a voltage based on an induced electromotive force generated at the inductors in accordance with current path switching and an output voltage of the battery; when the switching means sets the connection state to the charging connection state, converts an alternating current voltage output from the external power acquisition unit to a direct current voltage on the basis of current path switching and applies the direct current voltage thereof to the battery.

Furthermore, in the vehicle mounted converter relating to the present invention, it is preferable to include a drive circuit for controlling the drive motor of the mounted vehicle, wherein the switching means connects the drive circuit to the switching unit so that a voltage based on induced electromotive force generated at the inductors and the output voltage of the battery is output to the drive circuit when the connection state is set to the boost connection state; and disconnects the drive circuit from the switching unit when the connection state is set to the charging connection state.

Furthermore, the present invention is a vehicle mounted converter including a plurality of inductors; a switching unit for switching a current path; an external power acquisition unit for acquiring alternating current power from a power generation source provided separately from the mounted vehicle; and a switching means for switching the connection state of the inductors, the switching unit, and the external power acquisition unit to a boost connection state for connecting one end of each inductor to a path to a battery for vehicle drive power supply and connecting the other end of each inductor to the switching unit, or to a charging connection state for disconnecting one end of each inductor from the path to the battery, connecting one end of one of the plurality of inductors to the external power acquisition unit as well as connecting the other end thereof to a front-stage section of the switching unit, and further connecting the remaining inductors to the switching unit so that a magnetically coupled circuit is formed for magnetically coupling the front-stage section and a back-stage section of the switching unit; wherein the switching unit outputs a voltage based on induced electromotive force generated at the inductors in accordance with current path switching and an output voltage of the battery when the switching means sets the connection state to the boost connection state; and converts an alternating current voltage output from the external power acquisition unit to a direct current voltage based on current path switching and applies the direct current voltage thereof from the back-stage section to the battery when the switching means sets the connection state to the charging connection state.

Furthermore, in the vehicle mounted converter relating to the present invention, it is preferable to further include a drive circuit for controlling a drive motor of the mounted vehicle connected to the back-stage section, wherein when the switching means sets the connection state to the boost connection state, a voltage based on induced electromotive force generated at the inductors and the output voltage of the battery is output from the switching unit to the drive circuit.

According to the present invention, device size can be miniaturized for a vehicle mounted power supply device having an external charging function.

DETAILED DESCRIPTION OF THE INVENTION

Figure 1:
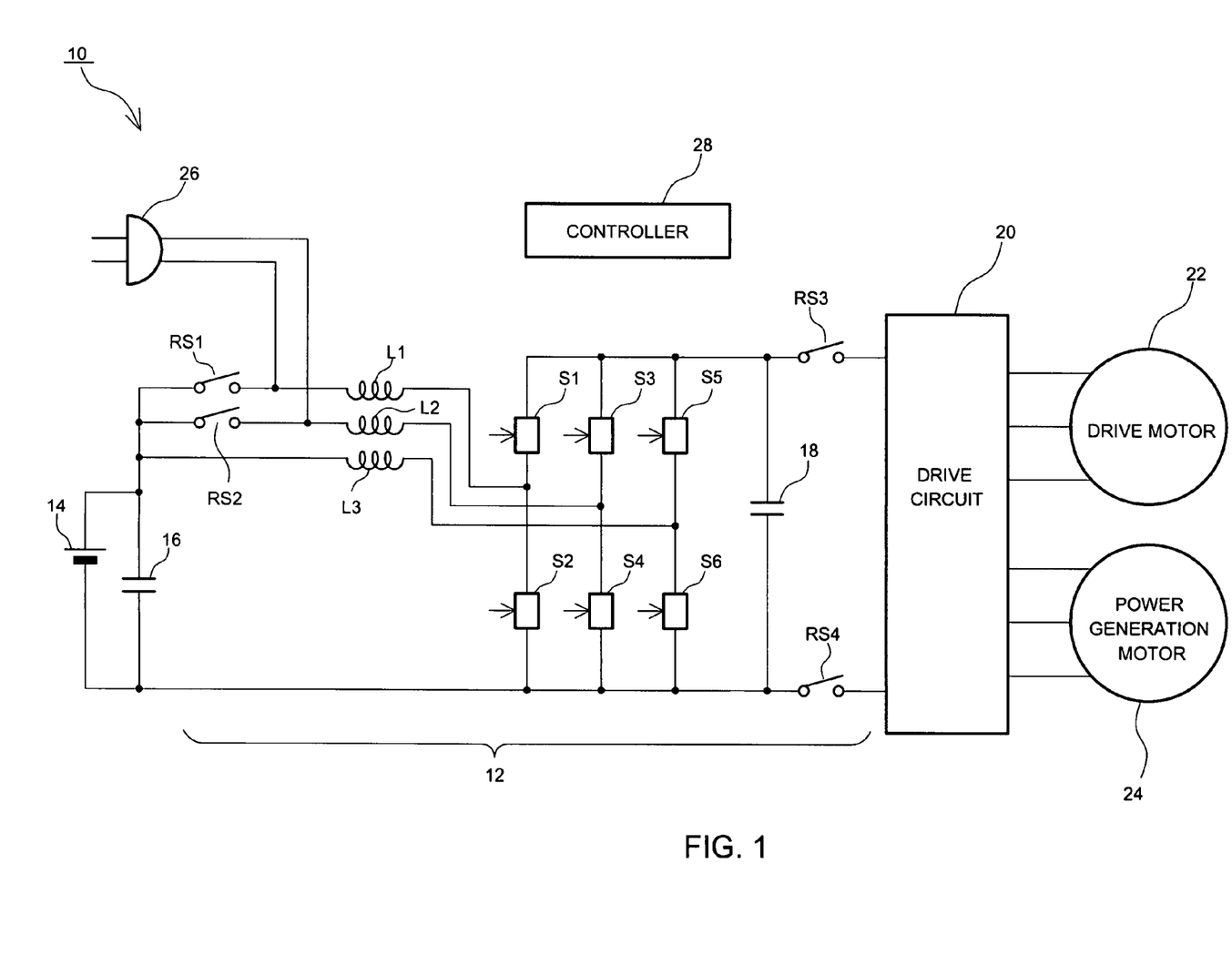
FIG. 1 shows a configuration of a hybrid vehicle drive system relating to a first embodiment.

FIG. 1 shows a configuration of a hybrid vehicle drive system 10 relating to the first embodiment of the present invention. The hybrid vehicle drive system 10 includes a switching three-phase multiphase converter 12. The switching three-phase multiphase converter 12 charges a battery 14 for vehicle drive power supply on the basis of power obtained from an external power supply device, such as a commercial power supply, or boosts and outputs the output voltage of the battery 14 to a drive circuit 20. Furthermore, the drive circuit 20, a drive motor 22, and a power generation motor 24 are provided, where the drive circuit 20 performs direct current to alternating current conversion and transfers power between the switching three-phase multiphase converter 12 and the drive motor 22 as well as the power generation motor 24.

The switching three-phase multiphase converter 12 has a configuration where inductors are connected to connection nodes between the switching devices connected at the top and bottom. The switching three-phase multiphase converter 12 operates in either a boost mode for boosting the output voltage of the battery 14 or an external charging mode for charging the battery 14 on the basis of power obtained from an external power supply device.

An input capacitor 16 is connected in parallel with both ends of the battery 14. To the positive electrode of the battery 14 is connected one end of a relay switch RS1, one end of a relay switch RS2, and one end of an inductor L3.

The other ends of the relay switches RS1 and RS2 are respectively connected to one end of inductors L1 and L2. The other end of the inductor L1 is connected to the connection node between the switching devices S1 and S2, and the other end of the inductor L2 is connected to the connection node between the switching devices S3 and S4. Furthermore, the other end of the inductor L3 is connected to the connection node between the switching devices S5 and S6.

One end of the switching device S1 opposite to the switching device S2 side, one end of the switching device S3 opposite to the switching device S4 side, and one end of the switching device S5 opposite to the switching device S6 side are connected in common to one end of a relay switch RS3. The other end of the relay switch RS3 is connected to the drive circuit 20.

One end of the switching device S2 opposite to the switching device S1 side, one end of the switching device S4 opposite to the switching device S3 side, and one end of the switching device S6 opposite to the switching device S5 side are connected in common to the negative electrode of the battery 14 and to a relay switch RS4. The other end of the relay switch RS4 is connected to the drive circuit 20. To the drive circuit 20 are connected the drive motor 22 and the power generation motor 24.

An output capacitor 18 is connected between the common connection node of the switching devices S1, S3, and S5 and the common connection node of the switching devices S2, S4, and s6.

A single-phase power supply plug 26 is connected between the connection node of the relay switch RS1 and the inductor L1 and the connection node of the relay switch RS2 and the inductor L2.

Figure 2:
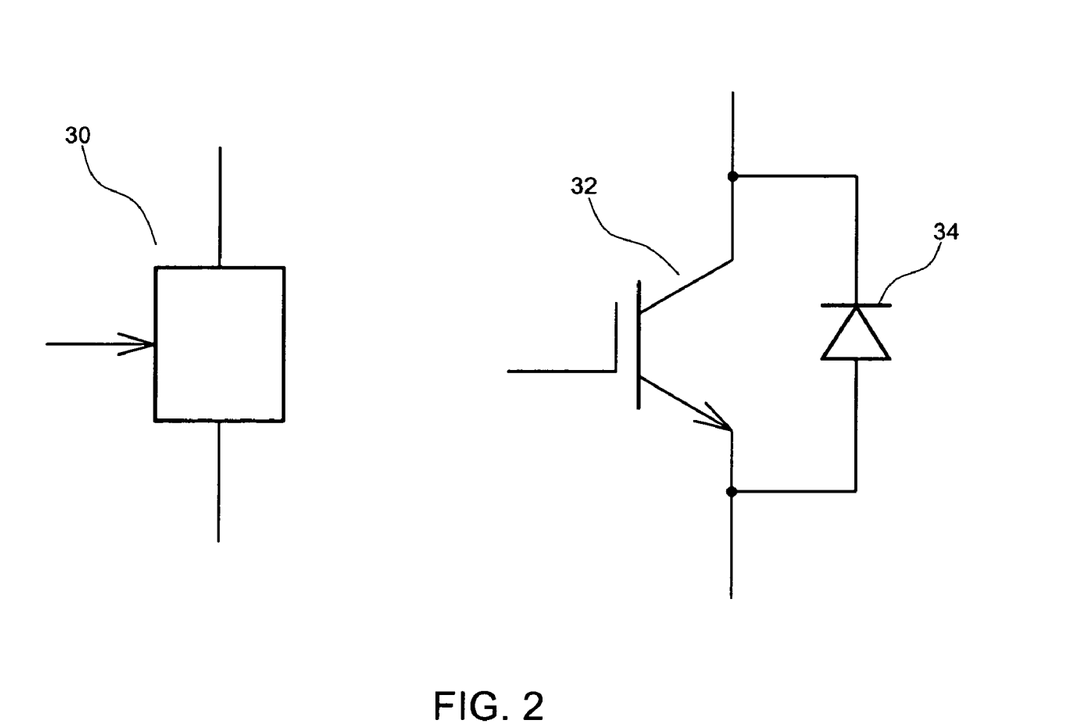
FIG. 2 shows an example configuration of a switching device.

The switching devices S1 to S6 and the relay switches RS1 to RS4 are controlled to turn on or off by a controller 28. Semiconductor devices, such as insulated gate bipolar transistors (IGBT), other common bipolar transistors, field effect transistors, and so forth, can be used for the switching devices S1 to S6. The same applies to other switching devices described hereinafter. When using IGBTs as the switching devices, the IGBTs are connected at the connected positions of the switching devices so that the collector terminals are on the upper side in FIG. 1 and the emitter terminals are on the lower side. Then, between the collector terminal and the emitter terminal of each IGBT is connected a diode so that the anode terminal is on the emitter terminal side. In this case, a current in the direction of emitter terminal to collector terminal flows through the diode due to the diode being forward biased. FIG. 2 shows that an IGBT 32 and a diode 34 shown on the right side can be used as a switching device 30 shown on the left side.

An operation of the boost mode will be described. In the boost mode, the controller 28 turns on the relay switches RS1 to RS4. Then, the next control is performed so that a voltage, which is the output voltage of the battery 14 that has been boosted, is output as the output voltage of the switching three-phase multiphase converter 12 to the drive circuit 20.

Of the two switching devices connected at the top and bottom, when the upper switching device is turned off and the lower switching device is turned on, current flows from the positive electrode of the battery 14 to the lower switching device via the inductor connected to the upper and lower switching devices. When the lower switching device is turned off in this state, an induced electromotive force is generated at the inductor. At this time, by turning on the upper switching device, a voltage where the induced electromotive force has been added to the output voltage of the battery 14 is applied to both ends of the output capacitor 18 and the drive circuit 20.

When the voltage where the induced electromotive force has been added to the output voltage of the battery 14 is greater than or equal to the voltage between terminals of the output capacitor 18, the output capacitor 18 is charged or the charged voltage of the output capacitor 18 is maintained. As a result, a voltage higher than the output voltage of the battery 14 can be output to the drive circuit 20.

When the voltage where the induced electromotive force has been added to the output voltage of the battery 14 is lower than the voltage between terminals of the output capacitor 18, current flows from the output capacitor 18 and the drive circuit 20 to the battery 14 and the input capacitor 16 via the upper switching device that is on and the inductor connected thereto. As a result, the battery 14 and the input capacitor 16 can be charged. The input capacitor 16 reduces the ripple component included in the output voltage of the battery 14 due to charging and discharging.

On the basis of this principle, the controller 28 controls the switching devices S1 to S6 so that a voltage where the inductor induced electromotive force has been added to the output voltage of the battery 14 is applied to the output capacitor 18 and the voltage between terminals of the output capacitor 18 is output to the drive circuit 20. The induced electromotive force generated at each inductor can be adjusted by varying the switching timing of each switching device.

The controller 28 adjusts the switching timing of each switching device in accordance with travel control so that a direct current voltage is output from the switching three-phase multiphase converter 12 to the drive circuit 20 in accordance with travel control of the mounted vehicle.

This embodiment has a configuration using three pairs of switching devices connected at the top and bottom. As a result, compared to the case using one or two pairs of upper and lower switching devices, the ripple component included in the direct current voltage that is output to the drive circuit 20 can be reduced.

The drive circuit 20 includes an inverter for performing direct current to alternating current conversion based on switching. The drive circuit 20 performs direct current to alternating current conversion between the switching three-phase multiphase converter 12 and the drive motor 22. In accordance with the magnitude relationship between the output voltage of the switching three-phase multiphase converter 12 and the voltage between terminals of the drive motor 22, the drive circuit 20 converts the direct current power, which the switching three-phase multiphase converter 12 outputs, to alternating current power and supplies the alternating current power thereof to the drive motor 22. Furthermore, in accordance with the magnitude relationship between the output voltage of the switching three-phase multiphase converter 12 and the voltage between terminals of the drive motor 22, the generated power from the drive motor 22 is converted to direct current power and the direct current power thereof is supplied to the switching three-phase multiphase converter 12.

Similarly, the drive circuit 20 performs direct current to alternating current conversion between the switching three-phase multiphase converter 12 and the power generation motor 24. In accordance with the magnitude relationship between the output voltage of the switching three-phase multiphase converter 12 and the voltage between terminals of the power generation motor 24, the drive circuit 20 converts the direct current power, which the switching three-phase multiphase converter 12 outputs, to alternating current power, and outputs the alternating current power thereof to the power generation motor 24. Furthermore, in accordance with the magnitude relationship between the output voltage of the switching three-phase multiphase converter 12 and the voltage between terminals of the power generation motor 24, the generated power from the power generation motor 24 is converted to direct current power and the direct current power thereof is supplied to the switching three-phase multiphase converter 12.

The drive motor 22 drives the mounted vehicle or performs regenerative dynamic braking. The power generation motor 24 performs power generation depending on the engine drive power or starting of the engine.

Next, an operation of the external charging mode will be described. The controller 28 controls the relay switches RS1 to RS4 to turn off. This results in the circuit configuration shown in FIG. 3. The same reference numerals have been applied to parts identical to those shown in FIG. 1.

Figure 3:
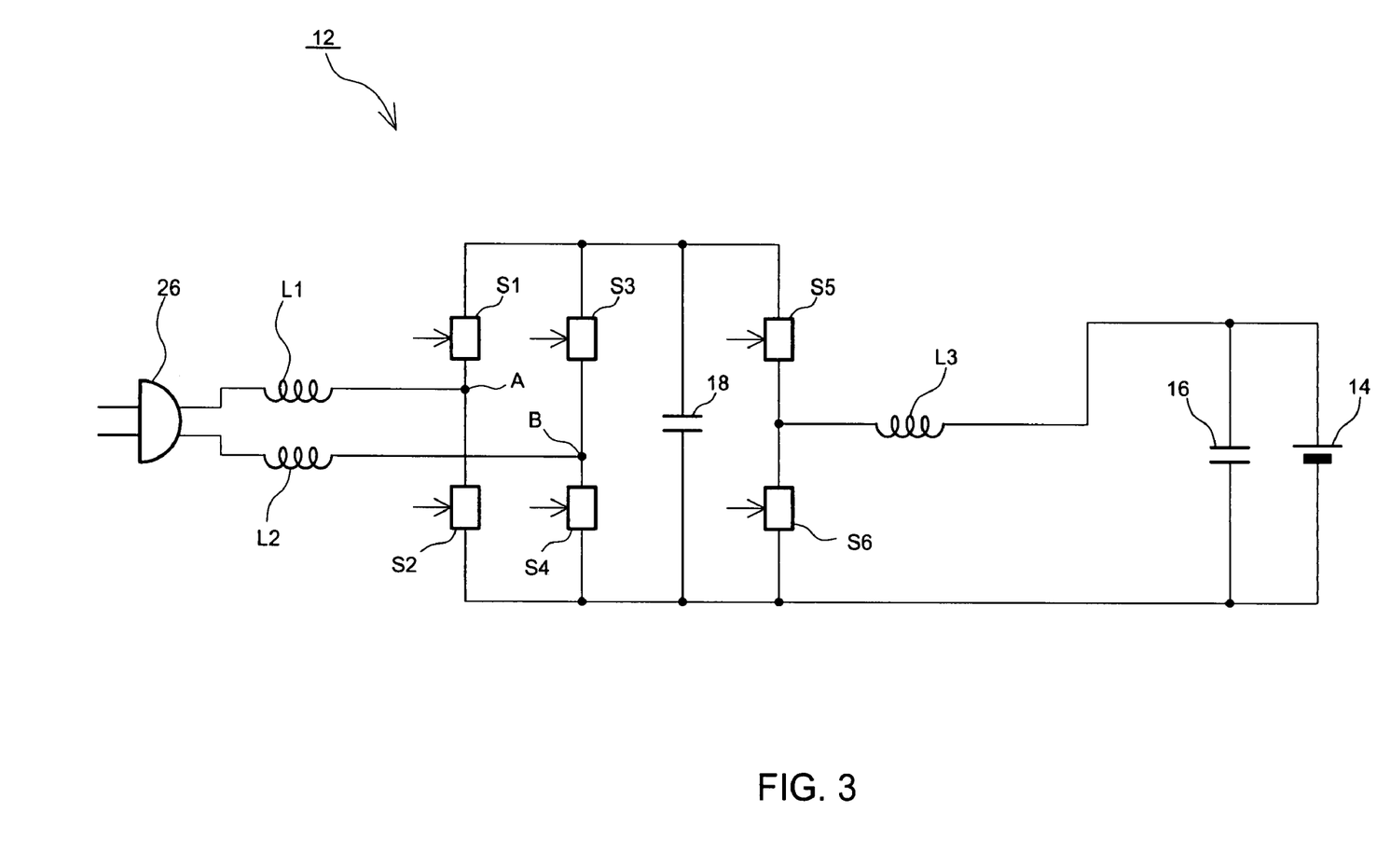
FIG. 3 shows a circuit configuration of a three-phase multiphase converter in an external charging mode.

The single-phase power supply plug 26 is inserted into a single-phase power supply receptacle. One electrode of the single-phase power supply plug 26 is connected to one end of the inductor L1 on the relay switch RS1 side and the other electrode of the single-phase power supply plug 26 is connected to one end of the inductor L2 on the relay switch RS2 side.

From the single-phase power supply plug 26 and via the inductors L1 and L2 a single-phase alternating current voltage is applied between a connection node A of the switching devices S1 and S2 and a connection node B of the switching devices S3 and S4. The controller 28 operates the switching devices S1 to S4 as a single-phase inverter. Namely, PWM (Pulse Width Modulation) control is performed for the switching devices S1 to S4, rectification and boosting of the alternating current voltage between connection nodes A and B are performed, and the resulting obtained direct current voltage is applied to the output capacitor 18.

When the voltage between electrodes of the single-phase power supply plug 26 is $V \sin(\omega t)$ (where V is voltage amplitude, $\omega$ is angular frequency, and t is time), for example, the controller 28 controls the switching devices S1 to S4 so that the voltage between terminals of the inductor L1 based on the single-phase power supply plug 26 side and the voltage between terminals of the inductor L2 based on the connection node B side become $(\frac{1}{2})B \cos(\omega t)$ (where B is voltage amplitude). Since current flowing through each inductor is an integral value of the terminal voltage, current flowing out from one end and flowing into another end of the single-phase power supply plug 26 at this time has the same phase as the voltage between electrodes of the single-phase power supply plug 26. As a result, the power factor between electrodes of the single-phase power supply plug 26 can be set as 1 and the withstand voltage and the withstand current of each part of the switching three-phase multiphase converter 12 can be suppressed to necessary minimum values. Furthermore, due to the induced electromotive force of the inductors L1 and L2, a voltage higher than the voltage amplitude between electrodes of the single-phase power supply plug 26 can be applied to the output capacitor 18.

The controller 28 performs the next control so that the voltage between terminals of the output capacitor 18 drops and the input capacitor 16 and the battery 14 are charged by the voltage after the drop.

When the switching device S6 is turned on and the switching device S5 is turned off, current flows from the positive electrode of the battery 14 to the switching device S6 via the inductor L3. When the switching device S6 is turned off in this state, an induced electromotive force is generated at the inductor L3. At this time, when a voltage where the induced electromotive force of the inductor L3 has been added to the output voltage of the battery 14 is lower than the voltage between terminals of the output capacitor 18, turning on the switch S5 causes electric charge to be discharged from the output capacitor 18 via the inductor L3 to the input capacitor 16 and the battery 14 so that the input capacitor 16 and the battery 14 can be charged.

On the basis of this principle, the controller 28 controls the switching devices S5 and S6 so that electric charge is discharged from the output capacitor 18 to the input capacitor 16 and the battery 14 thereby charging the input capacitor 16 and the battery 14. As a result, the switching three-phase multiphase converter 12 can obtain alternating current power from the external power supply device and charge the battery 14.

According to this configuration, the inductors L1 and L2, which are used as boost inductors in the boost mode, can be used as power factor improvement and boost inductors in the external charging mode. Furthermore, the inductor L3, which is used as a boost inductor in the boost mode, can be used as a voltage drop inductor in the external charging mode. As a result, parts used in the boost mode can be used in the external charging mode so that the size of the system can be miniaturized.

Figure 4:
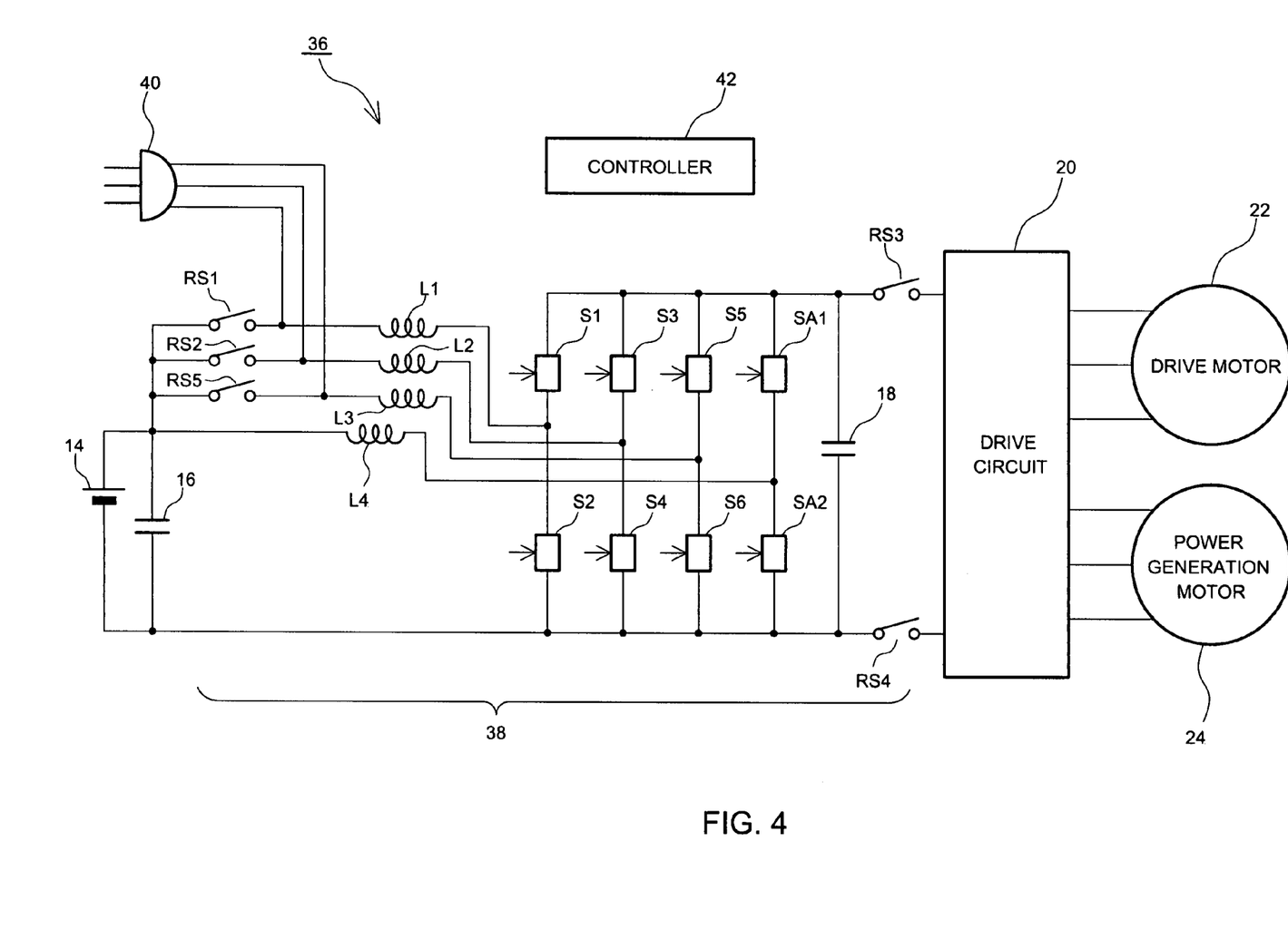
FIG. 4 shows a configuration of a hybrid vehicle drive system relating to an application example of the first embodiment.

Next, an application example of the first embodiment will be described. FIG. 4 shows a configuration of a hybrid vehicle drive system 36 relating to the application example. The same reference numerals have been applied to parts identical to those shown in FIG. 1 and the descriptions thereof will be omitted.

The hybrid vehicle drive system 36 includes a switching four-phase multiphase converter 38. The switching four-phase multiphase converter 38 adds an inductor L4, a relay switch RS5, and switching devices SA1 and SA2 to the switching three-phase multiphase converter 12 of FIG. 1 and enables the charging of the battery 14 with three-phase alternating current in the external charging mode.

One end of the relay switch RS5 is connected to the positive electrode of the battery 14. The other end of the relay switch RS5 is connected to one end of the inductor L3. The other end of the inductor L3 is connected to the connection node between the switching devices S5 and S6.

One end of the inductor L4 is connected to the positive electrode of the battery 14. The other end of the inductor L4 is connected to the connection node between the switching devices SA1 and SA2. One end of the switching device SA1 opposite to the switching device SA2 side is connected to a common connection node of the switching devices S1, S3, and S5. One end of the switching device SA2 opposite to the switching device SA1 side is connected to a common connection node of the switching devices S2, S4, and S6.

A three-phase power supply plug 40 is connected to the connection node between the relay switch RS1 and the inductor L1, the connection node between the relay switch RS2 and the inductor L2, and the connection node between the relay switch RS5 and the inductor L3.

When using IGBTs as switching devices SA1 and SA2, the IGBTs are connected at the connected positions of the switching devices so that the collector terminals are on the upper side in FIG. 4 and the emitter terminals are on the lower side. Then, between the collector terminal and the emitter terminal of each IGBT is connected a diode so that the anode terminal is on the emitter terminal side.

An operation in the boost mode will be described. In the boost mode, a controller 42 controls the relay switches RS1 to RS5 to turn on.

The controller 42 controls the switching devices S1 to S6, SA1, and SA2 so that a voltage where the inductor induced electromotive force has been added to the output voltage of the battery 14 is applied to the output capacitor 18 and the drive circuit 20 based on the same control principle with respect to the switching devices connected at the top and bottom in the switching three-phase multiphase converter 12. The induced electromotive force generated at each inductor can be adjusted by varying the switching timing of each switching device.

The controller 42 adjusts the switching timing of the switching devices in accordance with travel control so that a direct current voltage in accordance with travel control of the mounted vehicle is output from the switching four-phase multiphase converter 38 to the drive circuit 20.

This embodiment has a configuration using four pairs of switching devices connected at the top and bottom. As a result, compared to the case using less than four pairs of upper and lower switching devices, the ripple component included in the direct current voltage that is output to the drive circuit 20 can be reduced.

The drive circuit 20 performs direct current to alternating current conversion and power transfers between the switching four-phase multiphase converter 38 and the drive motor 22 as well as the power generation motor 24.

Next, an operation of the external charging mode will be described. The controller 42 controls the relay switches RS1 to RS5 to turn off. This results in the circuit configuration shown in FIG. 5. The same reference numerals have been applied to parts identical to those shown in FIG. 4.

Figure 5:
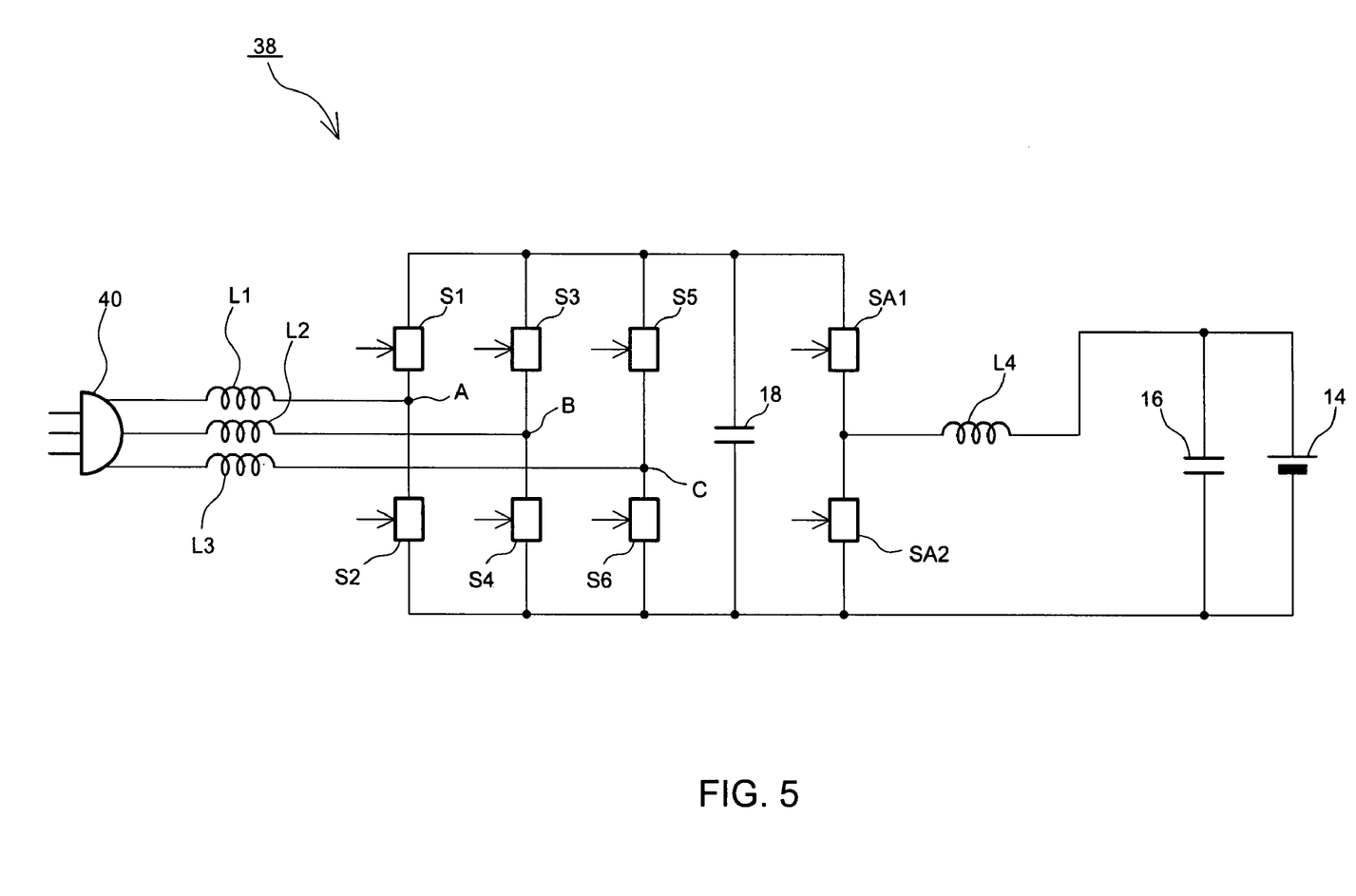
FIG. 5 shows a circuit configuration of a four-phase multiphase converter relating to an application example in the external charging mode.

The three-phase power supply plug 40 is inserted into a three-phase power supply receptacle. A first electrode of the three-phase power supply plug 40 is connected to one end of the inductor L1 on the relay switch RS1 side and a second electrode of the three-phase power supply plug 40 is connected to one end of the inductor L2 on the relay switch RS2 side. Furthermore, a third electrode of the three-phase power supply plug 40 is connected to one end of the inductor L3 on the relay switch RS5 side.

A three-phase alternating current voltage is applied from the three-phase power supply plug 40 via the inductors L1, L2, and L3 to the connection node A between the switching devices S1 and S2, the connection node B between the switching devices S3 and S4, and a connection node C between the switching devices S5 and S6. The controller 42 operates the switching devices S1 to S6 as a three-phase inverter. Namely, PWM control of the switching devices S1 to S6 is performed and interphase voltages mutually between the connection nodes A, B, and C are rectified and boosted so that the resulting direct current voltage is applied to the output capacitor 18.

When the voltages with respect to the neutral point voltage of the first to third electrodes of the three-phase power supply plug 40 are $V \sin(\omega t)$, $V \sin(\omega t+120°)$, and $V \sin(\omega t+240°)$, respectively, for example, the controller 42 controls the switching devices S1 to S6 so that currents flowing into the first to third electrodes are $I \sin(\omega t)$, $I \sin(\omega t+120°)$, and $I \sin(\omega t+240°)$, respectively (where I is current amplitude). As a result, the power factor between electrodes of the three-phase power supply plug 40 can be set to 1 and the withstand voltage and the withstand current of each part of the switching four-phase multiphase converter 38 can be suppressed to necessary minimum values. Furthermore, due to the induced electromotive force of the inductors L1 to L3, a voltage higher than the voltage amplitude between electrodes of the three-phase power supply plug 40 can be applied to the output capacitor 18.

Similar to the control with respect to the switching three-phase multiphase converter 12 of FIG. 3, the controller 42 controls the switching devices SA1 and SA2 so that electric charge is discharged from the output capacitor 18 to the input capacitor 16 and the battery 14 thereby charging the input capacitor 16 and the battery 14. Here, the inductor L4 of FIG. 5 has the same function as the inductor L3 of FIG. 3. As a result, the switching four-phase multiphase converter 38 can obtain three-phase alternating current power from the external power supply device and charge the battery 14.

According to this configuration, the inductors L1 to L3, which are used as boost inductors in the boost mode, can be used as power factor improvement and boost inductors in the external charging mode. Furthermore, the inductor L4 used as a boost inductor in the boost mode can be used as a voltage drop inductor in the external charging mode. As a result, parts used in the boost mode can be used in the external charging mode so that the size of the system can be miniaturized.

Figure 6:
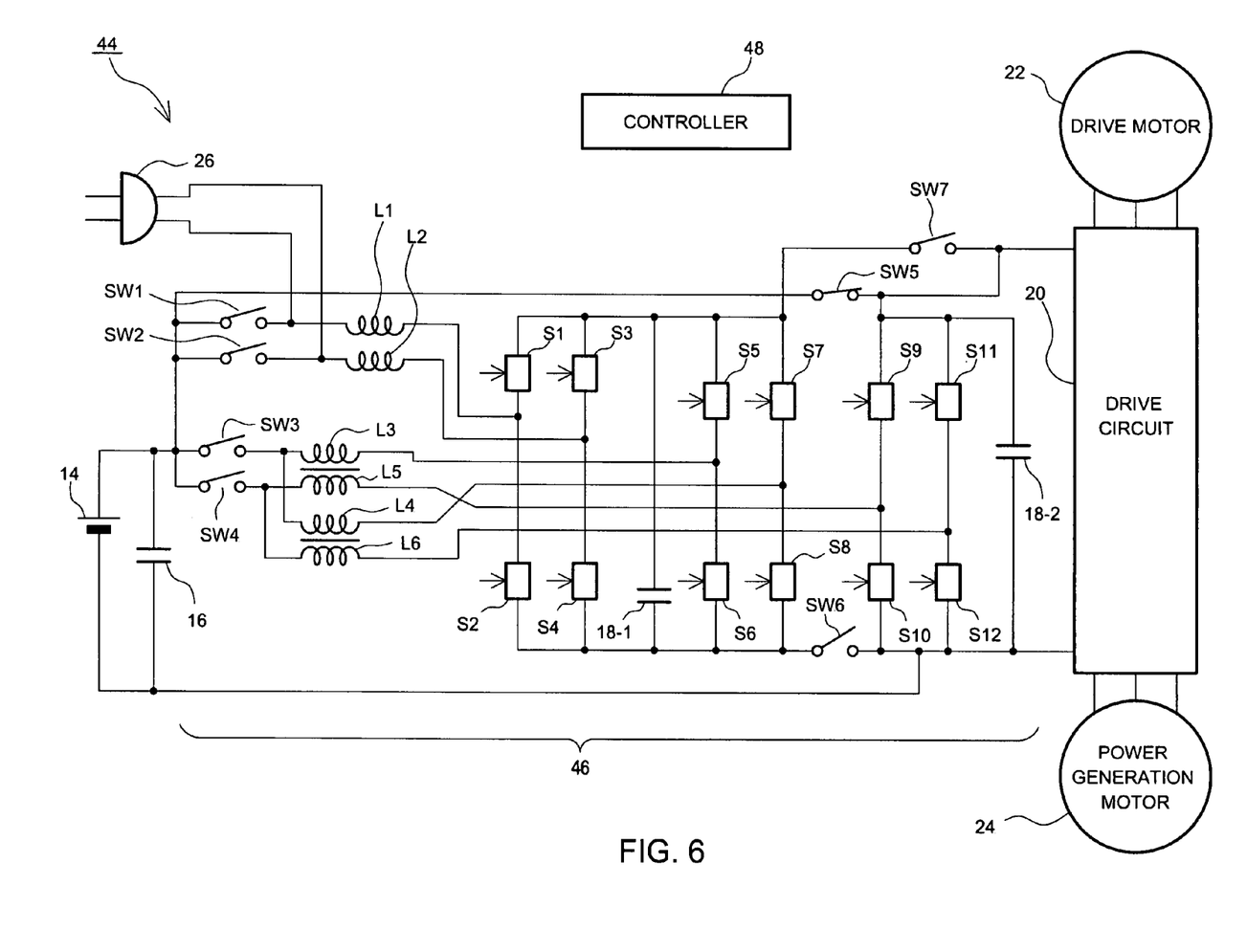
FIG. 6 shows a configuration of a hybrid vehicle drive system relating to a second embodiment.

FIG. 6 shows a configuration of a hybrid vehicle drive system 44 relating to a second embodiment of the present invention. The hybrid vehicle drive system 44 includes a switching six-phase multiphase converter 46. The switching six-phase multiphase converter 46 charges the battery 14 based on the electric power obtained from the external power supply device, such as a commercial power supply, or boosts and outputs the output voltage of the battery 14 to the drive circuit 20. The same reference numerals have been applied to parts identical to those shown in FIG. 1 and the descriptions thereof will be omitted.

The switching six-phase multiphase converter 46 has a configuration where inductors are connected to the connection nodes between the switching devices connected at the top and bottom. The switching six-phase multiphase converter 46 operates in either a boost mode for boosting the output voltage of the battery 14 or an external charging mode for charging the battery 14 on the basis of power obtained from an external power supply device.

Relay switches SW1 to SW4 have one end connected to the positive electrode of the battery 14. To the other ends of the relay switches SW1 and SW2 are connected one end of the inductor L1 and one end of the inductor L2, respectively. To the other end of the relay switch SW3 are connected one end of the inductor L3 and one end of the inductor L4 and to the other end of the relay switch SW4 are connected one end of an inductor L5 and one end of an inductor L6.

The other end of the inductor L1 is connected to the connection node between the switching devices S1 and S2 and the other end of the inductor L2 is connected to the connection node between the switching devices S3 and S4. Furthermore, the other end of the inductor L3 is connected to the connection node between the switching devices S5 and S6 and the other end of the inductor L4 is connected to the connection node between switching device S7 and S8. Moreover, the other end of the inductor L5 is connected to the connection node between switching devices S9 and S10 and the other end of the inductor L6 is connected to the connection node between switching devices S11 and S12.

One end of the switching device S1 opposite to the switching device S2 side, one end of the switching device S3 opposite to the switching device S4 side, one end of the switching device S5 opposite to the switching device S6 side, and one end of the switching device S7 opposite to the switching device S8 side are connected in common to one end of the relay switch SW7. The other end of the relay switch SW7 is connected to the drive circuit 20.

One end of the switching device S2 opposite to the switching device S1 side, one end of the switching device S4 opposite to the switching device S3 side, one end of the switching device S6 opposite to the switching device S5 side, and one end of the switching device S8 opposite to the switching device S7 side are connected in common to one end of a relay switch SW6. The other end of the relay switch SW6 is connected to the negative electrode of the battery 14 and to the drive circuit 20.

A front-stage output capacitor 18-1 is connected between a common connection node of the switching devices S1, S3, S5, and S7 and a common connection node of the switching devices S2, S4, S6, and S8.

One end of the switching device S9 opposite to the switching device S10 side and one end of the switching device S11 opposite to the switching device S12 side are connected to the drive circuit 20, one end of a relay switch SW5, and one end of a relay switch SW7. The other end of the relay switch SW5 is connected to the positive electrode of the battery 14.

One end of the switching device S10 opposite to the switching device S9 side and one end of the switching device S12 opposite to the switching device S11 side are connected to the negative electrode of the battery 14 and to the drive circuit 20.

A back-stage output capacitor 18-2 is connected between a common connection node of the switching devices S9 and S11 and a common connection node of the switching devices S10 and S12.

The single-phase power supply plug 26 is connected between a connection node of the relay switch SW1 and the inductor L1 and a connection node of the relay switch SW2 and the inductor L2.

The inductors L3 and L5 magnetically couple so that when current flows toward a switching device through one inductor, an induced electromotive force is generated at the other inductor causing current to flow toward a switching device. The inductors L4 and L6 magnetically couple so that when current flows toward a switching device through one inductor, an induced electromotive is generated at the other inductor causing current to flow toward a switching device.

The switching devices S1 to S12 and the relay switches SW1 to SW7 are controlled to turn on or off by a controller 48. When using IGBTs for the switching devices, the IGBTs are connected at the connected positions of the switching devices so that the collector terminals are on the upper side in FIG. 6 and the emitter terminals are on the lower side. Then, between the collector terminal and the emitter terminal of each IGBT is connected a diode so that the anode terminal is on the emitter terminal side.

An operation of the boost mode will be described. In the boost mode, the controller 48 controls the relay switches SW1 to SW4, SW6, and SW7 to turn on and the relay switch SW5 to turn off.

The controller 48 controls the switching devices S1 to S12 so that a voltage where the inductor induced electromotive force has been added to the output voltage of the battery 14 is applied to the front-stage output capacitor 18-1, the back-stage output capacitor 18-2, and the drive circuit 20 based on the same control principle with respect to the switching devices connected at the top and bottom in the switching three-phase multiphase converter 12 of FIG. 1. The induced electromotive force generated at each inductor can be adjusted by varying the switching timing of each switching device.

The controller 48 adjusts the switching timing of the switching devices in accordance with travel control so that a direct current voltage in accordance with travel control of the mounted vehicle is output from the switching six-phase multiphase converter 46 to the drive circuit 20.

This embodiment has a configuration using six pairs of switching devices connected at the top and bottom. As a result, compared to the case using less than six pairs of upper and lower switching devices, the ripple component included in the direct current voltage that is output to the drive circuit 20 can be reduced.

The drive circuit 20 performs direct current to alternating current conversion and power transfers between the switching six-phase multiphase converter 46 and the drive motor 22 as well as the power generation motor 24.

Next, an operation of the external charging mode will be described. The controller 48 controls the relay switches SW1 to SW4, SW6, and SW7 to turn off and SW5 to turn on. This results in the circuit configuration shown in FIG. 7. The same reference numerals have been applied to parts identical to those shown in FIG. 6. In the external charging mode, the switching six-phase multiphase converter 46 is divided into parts in a stage before inductor L3+L4 and parts in a stage after inductor L5+L6.

The single-phase power supply plug 26 is inserted into a single-phase power supply receptacle. One electrode of the single-phase power supply plug 26 is connected to one end of the inductor L1 on the relay switch SW1 side and the other electrode of the single-phase power supply plug 26 is connected to one end of the inductor L2 on the relay switch SW2 side. The drive circuit 20 is connected to the right side of the battery 14 in FIG. 7.

Figure 7:
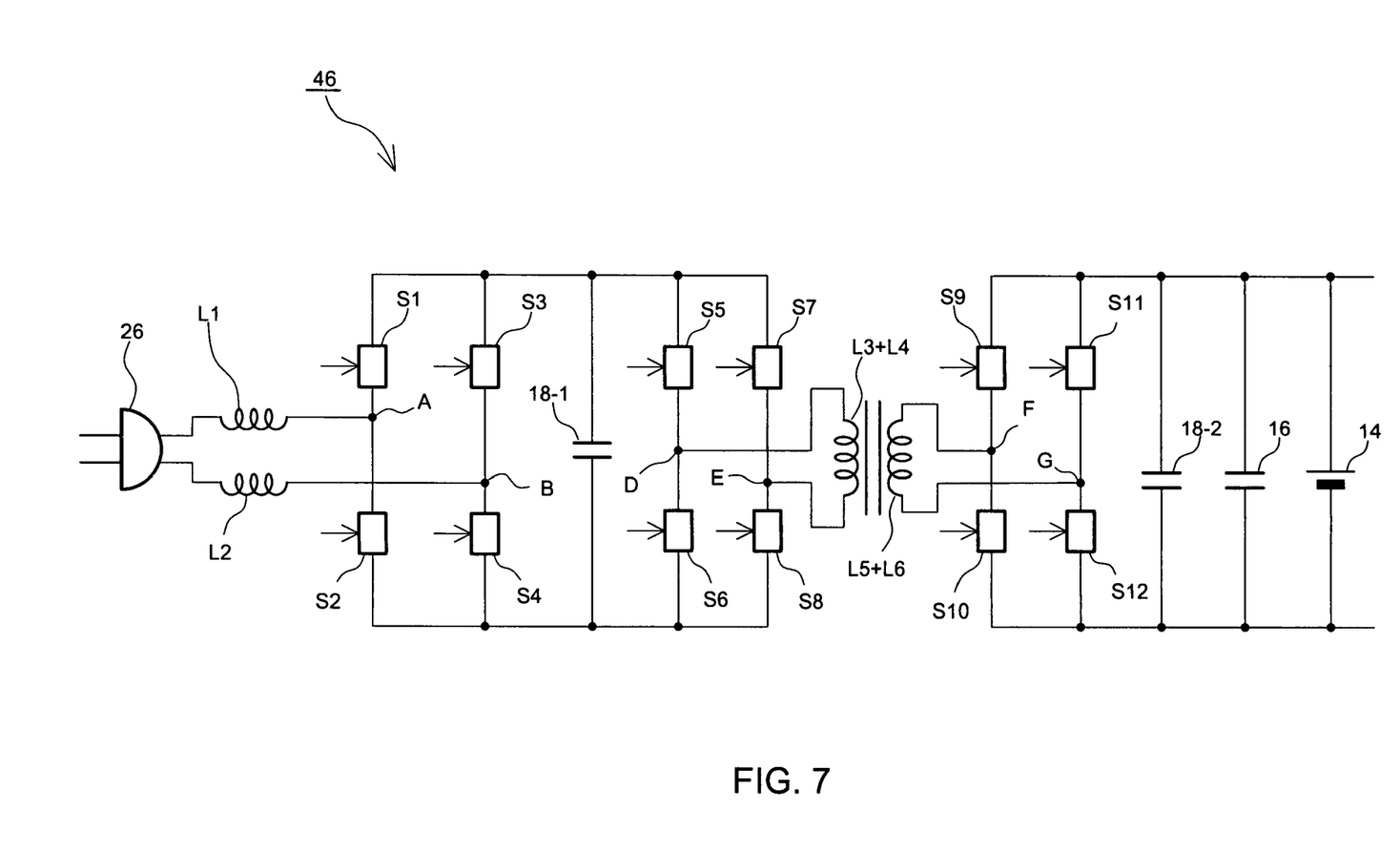
FIG. 7 shows a circuit configuration of a six-phase multiphase converter in the external charging mode.

Similar to the embodiment shown in FIG. 3, the controller 48 operates the switching devices S1 to S4 as a single-phase inverter. As a result, an alternating current voltage between connection nodes A and B is rectified and boosted and the direct current voltage after rectification and boosting is applied to the front-stage output capacitor 18-1.

The primary-side inductor L3+L4 is connected between a connection node D of the switching devices S5 and S6 and a connection node E of the switching devices S7 and S8.

The primary-side inductor L3+L4 has inductors L3 and L4 connected in series. The secondary inductor L5+L6 is connected between a connection node F of the switching devices S9 and S10 and a connection node G of the switching devices S11 and S12. The secondary inductor L5+L6 has the inductors L5 and L6 connected in series.

The controller 48 operates the switching devices S5 to S8 as a single-phase inverter. Namely, PWM control is performed for the switching devices S5 to S8, the voltage between terminals of the front-stage output capacitor 18-1 is converted to an alternating current voltage, and the alternating current voltage thereof is applied to the primary-side inductor L3+L4. The magnetic coupling of the primary-side inductor L3+L4 and the secondary-side inductor L5+L6 causes an alternating current voltage to be generated at the secondary-side inductor L5+L6 and the alternating current voltage thereof is applied between the connection node F and the connection node G.

The controller 48 operates the switching devices S9 to S12 as a single-phase inverter. Namely, PWM control of the switching devices S9 to S12 is performed, the alternating current voltage applied from the secondary-side inductor L5+L6 to between the connection node F and the connection node G is rectified, and the direct current voltage after rectification is applied to the back-stage output capacitor 18-2, the input capacitor 16, and the battery 14. As a result, the switching six-phase multiphase converter 46 can obtain power from the external power supply device and charge the battery 14.

According to this configuration, the inductors L1 and L2, which are used as boost inductors in the boost mode, can be used as power factor improvement and boost inductors in the external charging mode. As a result, parts used in the boost mode can be used in the external charging mode so that the size of the system can be miniaturized.

Furthermore, in the external charging mode, on the basis of the magnetic coupling of the primary-side inductor L3+L4 and the secondary-side inductor L5+L6, the front-stage section and the back-stage section are coupled and electrically insulated. This makes it possible to avoid an application of a high voltage to the front-stage section, and during the handling of the single-phase power supply plug 26 in the front-stage section to avoid shortening of the system life, such as due to contact between parts being applied with high voltages.

Figure 8:
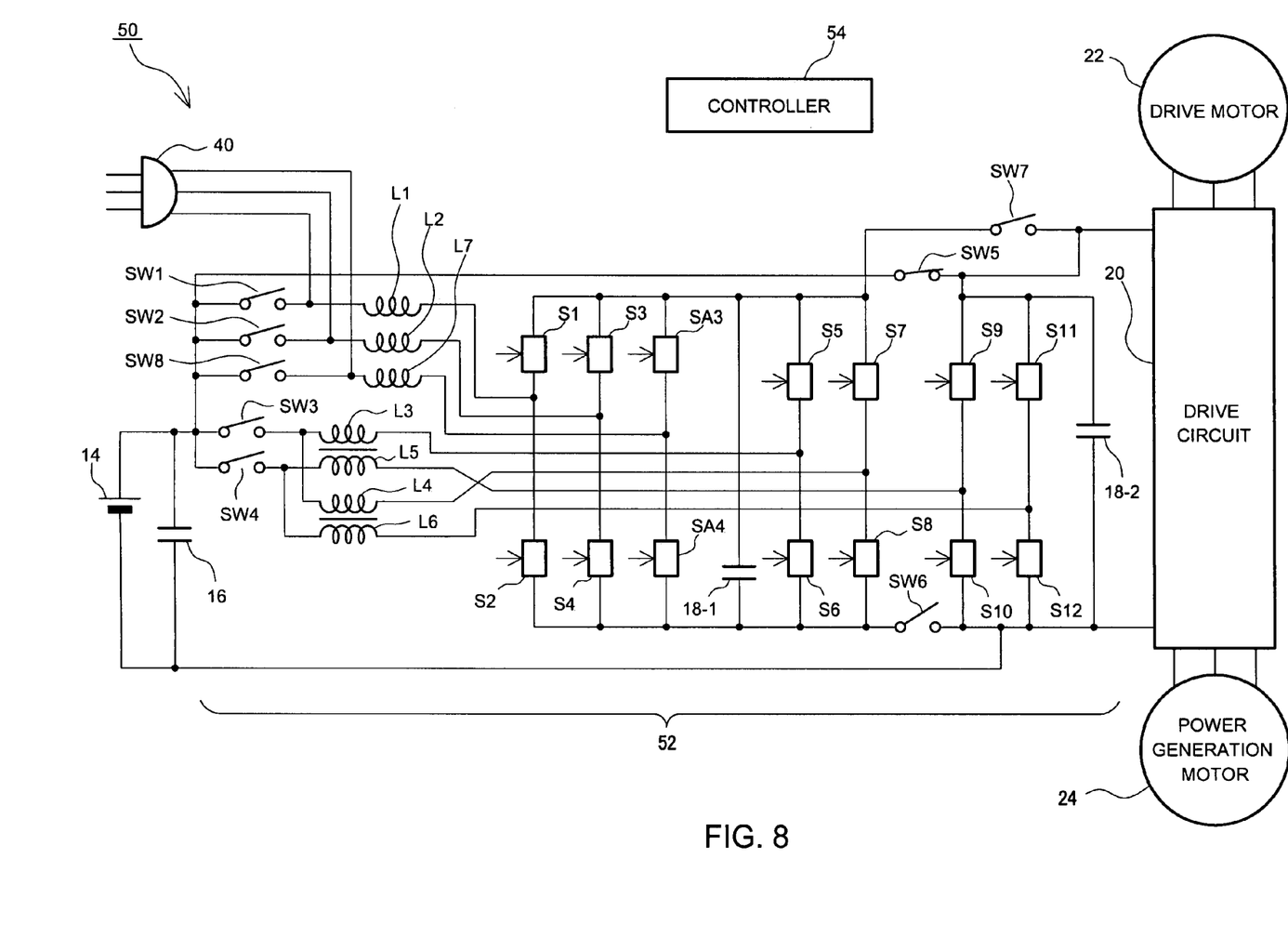
FIG. 8 shows a configuration of a hybrid vehicle drive system relating to an application example of the second embodiment.

Next, an application example of the second embodiment will be described. FIG. 8 shows a configuration of a vehicle drive system 50 relating to the application example. The same reference numerals have been applied to parts identical to those shown in FIG. 6 and the descriptions thereof will be omitted.

The hybrid vehicle drive system 50 includes a switching seven-phase multiphase converter 52. The seven-phase multiphase converter 52 adds an inductor L7, a relay switch SW8, and switching devices SA3 and SA4 to the switching six-phase multiphase converter 46 of FIG. 6 and makes charging of the battery 14 possible with three-phase alternating current power in the external charging mode.

One end of the relay switch SW8 is connected to the positive electrode of the battery 14. The other end of the relay switch SW8 is connected to one end of the inductor L7. The other end of the inductor L7 is connected to a connection node between the switching devices SA3 and SA4.

One end of the switching device SA3 opposite to the switching device SA4 side is connected to a common connection node of the switching devices S1, S3, S5, and S7. One end of the switching device SA4 opposite to the switching device SA3 side is connected to a common connection node of the switching devices S2, S4, S6, and S8.

The three-phase power supply plug 40 is connected to the connection node of the relay switch SW1 and the inductor L1, the connection node of the relay switch SW2 and the inductor L2, and the connection node of the relay switch SW8 and the inductor L7.

When using IGBTs as the switching devices SA3 and SA4, the IGBTs are connected at the connected positions of the switching devices so that the collector terminals are on the upper side in FIG. 8 and the emitter terminals are on the lower side. Then, between the collector terminal and the emitter terminal of each IGBT is connected a diode so that the anode terminal is on the emitter terminal side.

An operation of the boost mode will be described. In the boost mode, a controller 54 controls the relay switches SW1 to SW4 and SW6 to SW8 to turn on and SW5 to turn off.

The controller 54 controls the switching devices S1 to S12, SA3, and SA4 so that a voltage where the inductor induced electromotive force has been added to the output voltage of the battery 14 is applied to the front-stage output capacitor 18-1, the back-stage output capacitor 18-2, and the drive circuit 20 based on the same control principle with respect to the switching devices connected at the top and bottom in the switching six-phase multiphase converter 46 of FIG. 6. The induced electromotive force generated at each inductor can be adjusted by varying the switching timing of each switching device.

The controller 54 adjusts the switching timing of the switching devices in accordance with travel control so that a direct current voltage in accordance with travel control of the mounted vehicle is output from the switching seven-phase multiphase converter 52 to the drive circuit 20.

This embodiment has a configuration using seven pairs of switching devices connected at the top and bottom. As a result, compared to the case using less than seven pairs of upper and lower switching devices, the ripple component included in the direct current voltage that is output to the drive circuit 20 can be reduced.

The drive circuit 20 performs direct current to alternating current conversion and power transfers between the switching seven-phase multiphase converter 52 and the drive motor 22 as well as the power generation motor 24.

Next, an operation in the external charging mode will be described. The controller 54 controls the relay switches SW1 to SW4 and SW6 to SW8 to turn off and SW5 to turn on. This results in the circuit configuration shown in FIG. 9. The same reference numerals have been applied to parts identical to those shown in FIG. 8.

Figure 9:
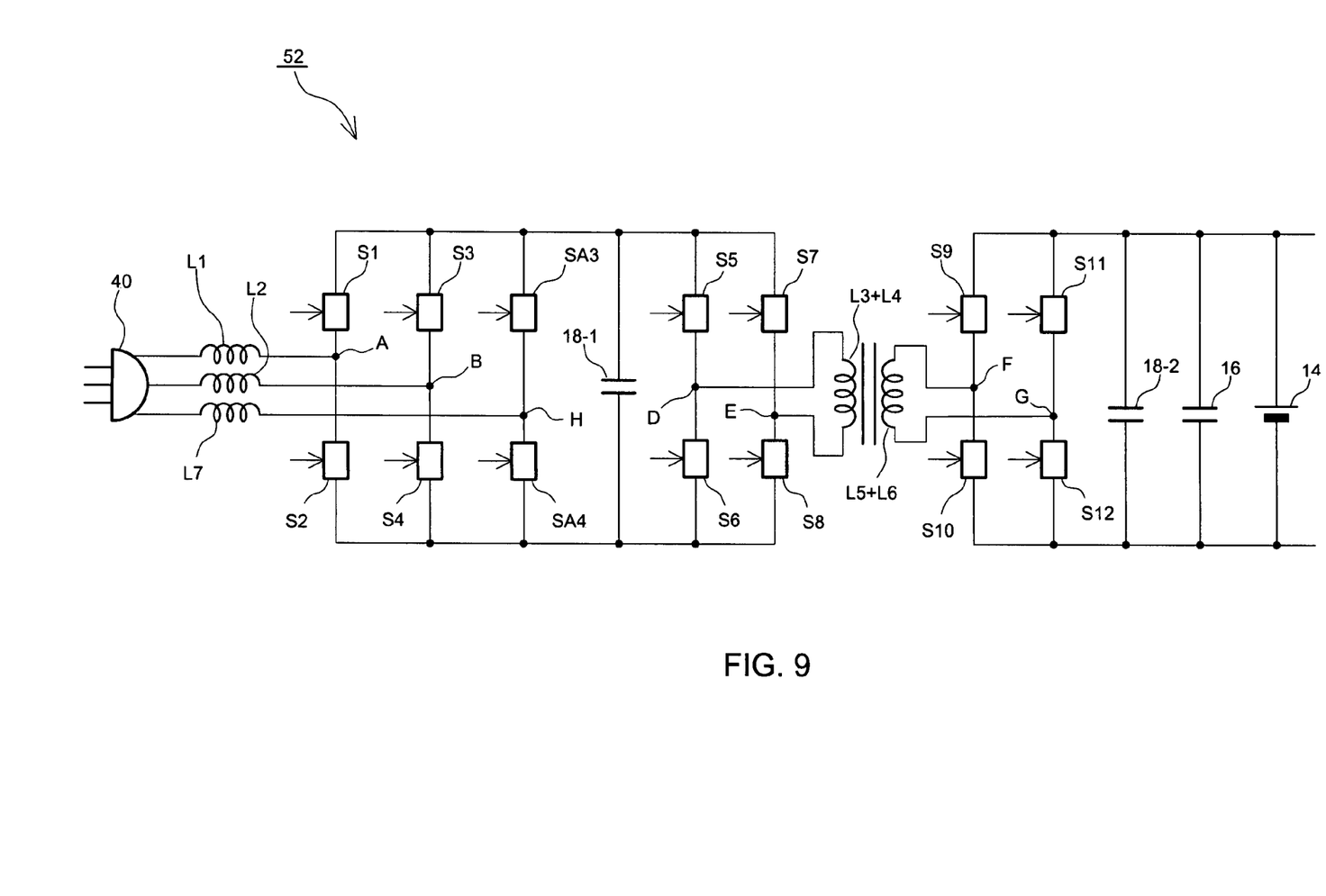
FIG. 9 shows a circuit configuration of a seven-phase multiphase converter relating to an application example in the external charging mode.

The three-phase power supply plug 40 is inserted into a three-phase power supply receptacle. The first electrode of the three-phase power supply plug 40 is connected to one end of the inductor L1 on the relay switch SW1 side and the second electrode of the three-phase power supply plug 40 is connected to one end of the inductor L2 on the relay switch SW2 side. Furthermore, the third electrode of the three-phase power supply plug 40 is connected to one end of the inductor L7 on the relay switch SW8 side.

A three-phase alternating current voltage is applied from the three-phase power supply plug 40 via the inductors L1, L2, and L7 to the connection node A of the switching devices S1 and S2, the connection node B of the switching devices S3 and S4, and a connection node H of the switching devices SA3 and SA4. The controller 54 operates the switching devices S1 to S4, SA3, and SA4 as a three-phase inverter. As a result, interphase voltages mutually between the connection nodes A, B, and H are rectified and boosted so that the resulting direct current voltage is applied to the front-stage output capacitor 18-1.

When the voltages with respect to the neutral point voltage of the first to third electrodes of the three-phase power supply plug 40 are $V \sin(\omega t)$, $V \sin(\omega t+120°)$, and $V \sin(\omega t+240°)$, respectively, for example, the controller 54 controls the switching devices S1 to S4, SA3, and SA4 so that currents flowing into the first to third electrodes are $I \sin(\omega t)$, $I \sin(\omega t+120°)$, and $I \sin(\omega t+240°)$, respectively. As a result, the power factor between electrodes of the three-phase power supply plug 40 can be set to 1 and the withstand voltage and the withstand current of each part of the switching seven-phase multiphase converter 52 can be suppressed to necessary minimum values. Furthermore, due to the induced electromotive force of the inductors L1, L2, and L7, a voltage higher than the voltage amplitude between electrodes of the three-phase power supply plug 40 can be applied to the front-stage output capacitor 18-1.

Similar to the control with respect to the switching six-phase multiphase converter 46 of FIG. 7, the controller 54 operates the switching devices S5 to S8 as a single-phase inverter and the switching devices S9 to S12 as a single-phase inverter. As a result, the switching seven-phase multiphase converter 52 can obtain the three-phase alternating current voltage from the external power supply device and charge the battery 14.

According to this configuration, the inductors L1, L2, and L7, which are used as boost inductors in the boost mode, can be used as power factor improvement and boost inductors in the external charging mode.

Furthermore, in the external charging mode, on the basis of the magnetic coupling of the primary-side inductor L3+L4 and the secondary-side inductor L5+L6 the front-stage section and the back-stage section are coupled and electrically insulated. This makes it possible to avoid an application of a high voltage to the front-stage section, and during the handling of the single-phase power supply plug 26 in the front-stage section to avoid a shortening of the system life, such as due to contact between parts being applied with high voltages.

Examples using the switching multiphase converter relating to embodiments of the present invention in hybrid vehicle drive systems were described in the aforementioned. The switching multiphase converter relating to the embodiments of the present invention can be used in electric automobiles. In this case, it is not absolutely necessary to use the power generation motor 24 and the drive circuit 20 may have a configuration for direct current to alternating current conversion and power transfers between the switching multiphase converter and the drive motor 22.

Further, among the relay switches employed in the above-described embodiments, those provided in the capacitor discharge path may be additionally provided with a discharge circuit using a resistor.

What is claimed is:

1. A vehicle mounted converter comprising:
a plurality of inductors;
a switching unit for switching a current path;
an external power acquisition unit for acquiring alternating current power from a power generating source disposed separately from a mounted vehicle;
a switching means for switching a connection state of inductors, said switching unit, and said external power acquisition unit to a connection state of either a boost connection state for connecting one end of each inductor to a path to a battery for vehicle drive power supply and connecting the other end of each inductor to said switching unit, or a charging connection state for connecting one end of one of said plurality of inductors to said path to the battery, disconnecting one end of remaining inductors from said path to the battery and connecting to said external power acquisition unit, and connecting the other end of each inductor to said switching unit; and
a drive circuit for controlling a drive motor of the mounted vehicle: wherein
said switching unit:
when said switching means sets the connection state to said boost connection state, outputs from said vehicle mounted converter a voltage based on an induced electromotive force generated at the inductors in accordance with current path switching and an output voltage of said battery;
when said switching means sets the connection state to said charging connection state, converts an alternating current voltage output from said external power acquisition unit to a direct current voltage on the basis of current path switching and applies the direct current voltage thereof to said battery; and
said switching means:
connects said drive circuit to said switching unit so that a voltage based on induced electromotive force generated at the inductors and the output voltage of said battery is output to said drive circuit when the connection state is set to said boost connection state; and
disconnects said drive circuit from said switching unit when the connection state is set to said charging connection state.

2. A vehicle mounted converter comprising:
a plurality of inductors;
a switching unit for switching a current path;
an external power acquisition unit for acquiring alternating current power from a power generation source disposed separately from a mounted vehicle; and
a switching means for switching a connection state of the inductors, said switching unit, and said external power acquisition unit to a boost connection state for connecting one end of each inductor to a path to a battery for vehicle drive power supply and connecting the other end of each inductor to said switching unit, or to a charging connection state for disconnecting one end of each inductor from said path to the battery, connecting one end of one of said plurality of inductors to said external power acquisition unit as well as connecting the other end thereof to a front-stage section of said switching unit, and further connecting the remaining inductors to said switching unit so that a magnetically coupled circuit is formed for magnetically coupling the front-stage section and a back-stage section of said switching unit, the front-stage section and the back-stage section not being electrically connected by conduction;

said switching unit:

outputs a voltage based on induced electromotive force generated at the inductors in accordance with current path switching and an output voltage of said battery when said switching means sets the connection state to said boost connection state; and converts an alternating current voltage output from said external power acquisition unit to a direct current voltage based on current path switching and applies the direct current voltage thereof from said back-stage section to said battery when said switching means sets the connection state to said charging connection state.

3. A vehicle mounted converter according to claim 2, further comprising a drive circuit for controlling a drive motor of the mounted vehicle connected to said back-stage section, wherein when said switching means sets the connection state to said boost connection state, a voltage based on induced electromotive force generated at the inductors and the output voltage of said battery is output from said switching unit to said drive circuit.

* * * * *